UNITED STATES PATENT OFFICE 1,931,077

1-AMINO-5-METHOXY-BENZO-THIAZOLE

Herbert August Lubs and Arthur Lawrence Fox, Wilmington, Del., assignors to E. I. du Pont de Nemours & Company, Wilmington, Del., a corporation of Delaware No Drawing. Application August 5, 1931
Serial No. 555,358

1 Claim. (Cl. 260—44)

This invention relates to a new compound which contains both nitrogen and sulphur and has in its molecule a thiazole ring. It has a formula corresponding to the following structure:

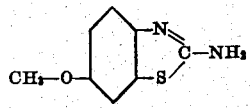

In general, the compound is formed from p-anisyl-thiourea by the action of halogens or halogenating substances, such as chlorine, sulfuryl chloride, sulfur chloride, bromine, etc. This method results in the production of the hydrohalide of the amino thiazole and may be readily converted to the free base by the use of alkali. An example of this invention follows:

Example 9.1 grams p-anisyl-thiourea and 50 cc. chloro benzene were mixed in a beaker and stirred while a mixture of 20 cc. chloro benzene and 8.75 grams bromine was gradually added. A vigorous reaction took place and the product was formed as coarse grey green granules. These were stirred one hour and filtered. Yield 12.5 grams—9.5% as the hydrobromide of 5-methoxy-1-amino benzothiazole.

Three grams of this hydrobromide was added to 35 cc. water containing one gram sodium bisulfite and heated to the boil. One cc. hydrochloric acid was then added and it was filtered. The filtrate was treated with decolorizing charcoal, filtered again, and the free base precipitated by the addition of ammonia. It melted at 161–162.5°.

In the above example in place of bromine there may be used an equivalent amount of chlorine or sulfuryl chloride, and it is also possible to use mixtures of sulfuryl chloride with either chlorine or bromine.

Since many embodiments of this invention, differing widely in one or more respects, may be made without departing from the spirit of our invention, it is to be understood that we do not limit ourselves to the foregoing examples or description except as indicated in the following claim:

We claim:
The product probably having the formula

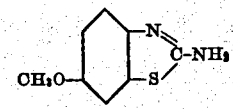

which is substantially identical with the product obtainable by mixing about 9.1 parts of para-anisyl-thiourea and about 55 parts of chloro-benzene and stirring the same while gradually adding about 22 parts of chloro-benzene containing about 8.75 parts of bromine, stirring for about one hour, filtering, adding the filtered residue to about 146 parts of water containing about 4.2 parts of sodium bisulphite, boiling, acidifying the reaction mass with hydrochloric acid, filtering, treating the filtrate with decolorizing charcoal, filtering and precipitating with ammonia; and which is when dry a white crystalline substance melting at about 161°–162.5° C.

HERBERT A. LUBS.
ARTHUR LAWRENCE FOX.